United States Patent
Bosga (10) Patent No.: US 8,869,689 B2
(45) Date of Patent: Oct. 28, 2014

(54) METHOD IN A PRODUCTION SYSTEM FOR LIMITING PEAK POWER

(75) Inventor: Sjoerd Bosga, Västerås (SE)

(73) Assignee: ABB Research Ltd. (CH)

(*) Notice: Subject to any disclaimer, the term of this patent is extended or adjusted under 35 U.S.C. 154(b) by 0 days.

(21) Appl. No.: 13/153,054

(22) Filed: Jun. 3, 2011

(65) Prior Publication Data
US 2011/0232513 A1    Sep. 29, 2011

Related U.S. Application Data

(63) Continuation of application No. PCT/EP2008/066946, filed on Dec. 5, 2008.

(51) Int. Cl.
*B30B 15/14* (2006.01)
*B30B 15/26* (2006.01)
*B30B 1/26* (2006.01)

(52) U.S. Cl.
CPC .............. B30B 1/266 (2013.01); B30B 15/26 (2013.01); B30B 15/148 (2013.01)
USPC ................ 100/35; 100/48; 100/282

(58) Field of Classification Search
USPC ............ 100/43, 48, 207, 275, 280, 282, 283; 72/429, 441, 443, 449, 452.5, 453.11
See application file for complete search history.

(56) References Cited

U.S. PATENT DOCUMENTS

| 5,425,682 | A * | 6/1995 | Hayashi | 475/5 |
| 5,468,194 | A * | 11/1995 | Hayashi | 477/3 |
| 2004/0003729 | A1* | 1/2004 | Aoshima | 100/35 |
| 2005/0145117 | A1* | 7/2005 | Du et al. | 100/281 |
| 2008/0016940 | A1* | 1/2008 | Schmeink | 72/435 |
| 2010/0089258 | A1* | 4/2010 | Bosga | 100/102 |

FOREIGN PATENT DOCUMENTS

| DE | 202007008897 U1 | 9/2007 |
| EP | 0561604 A1 | 9/1993 |
| EP | 1930149 A1 | 6/2008 |
| JP | H06190598 A | 7/1994 |
| JP | 2004034111 A | 2/2004 |
| JP | 2008023599 A | 2/2008 |
| JP | 2009525879 A | 7/2009 |
| JP | 2010528869 A | 8/2010 |

(Continued)

OTHER PUBLICATIONS

International Search Report and Written Opinion of the International Searching Authority; PCT/EP2008/066946; Jul. 29, 2009; 10 pages.

(Continued)

*Primary Examiner* — Jimmy T Nguyen
(74) *Attorney, Agent, or Firm* — St. Onge Steward Johnston & Reens LLC (57) ABSTRACT

A production system has at least one mechanical press driven at least in part by a flywheel powered by a first motor. The system further includes a second motor which is a servo motor. The power of the first motor powering the flywheel is arranged controlled by a control unit dependent on a function of the power of at least one second motor, the servo motor. In this way, the peak power of at least the first and the second motor may be limited. A method for operating the system and a computer program are also contemplated.

28 Claims, 5 Drawing Sheets

(56) References Cited

FOREIGN PATENT DOCUMENTS

| | | | |
|---|---|---|---|
| WO | 2007091935 | A1 | 8/2007 |
| WO | 2007091964 | A2 | 8/2007 |
| WO | 2008149171 | A1 | 12/2008 |

OTHER PUBLICATIONS

First Office Action from Japan Application No. 2011-538843 Mailing Date: Mar. 12, 2013 4 pages.

* cited by examiner

METHOD IN A PRODUCTION SYSTEM FOR LIMITING PEAK POWER

CROSS-REFERENCE TO RELATED APPLICATIONS

The present application is a continuation of pending International patent application PCT/EP2008/066946 filed on Dec. 5, 2008 which designates the United States, and the content of which is incorporated herein by reference.

FIELD OF THE INVENTION

The invention concerns a method for operating a production system for forming parts or semi-finished products comprising at least one mechanical press arranged with an electric motor driving a high inertia device such as a flywheel. In particular the invention is concerned with a method of limiting peak power consumption in such a production system. Advantageous configurations for production systems comprising any of mechanical presses, hybrid presses and/or servo presses are also described.

BACKGROUND OF THE INVENTION

Mechanical presses are commonly used to form industrial products such as automobile parts which are stamped or pressed from steel blanks or workpieces. Today's large mechanical presses are traditionally and most often driven by a flywheel. The function of the flywheel is to store the necessary energy to carry out a pressing, stamping, punching etc operation. A motor drives the flywheel so that before the start of a press operation the flywheel is rotating at the speed at which the pressing will occur. Thus the flywheel motor has the function of driving a high inertia load at a substantially constant speed.

In such presses, parts are pressed between an upper and a lower die. The upper die is connected to the press slide, which moves up and down in the slide guides, while the lower die is either fixed or mounted on a bed. The slide motion is driven by the press mechanism, which is located in the upper part of the press, known as the crown. The press mechanism consists of speed-reducing gears and a mechanism which translates rotating motion of the gears into linear motion of the slide. This translation can either be a relatively simple eccentric mechanism, or a more complicated link-drive mechanism. The gears today are driven by the flywheel, which is connected to the so-called main shaft (or high-speed shaft) through a clutch. A brake is also connected to this same shaft.

In a conventional mechanical press the press continues to rotate after each pressing stage is completed until its eccentric wheel has rotated one complete turn. During this second stage following pressing, the motor driving the flywheel will slowly increase the rotational speed and regain the normal pressing speed. At the end of the operation, the clutch is disengaged and a brake is used to stop the motion of the press. In the traditional mechanical solution, press speed is fixed and proportional to flywheel speed during the complete operation. Thus, if pressing has to be done at a low speed (for quality or other technical reasons), the complete operation will occur at low speed. This results in a long cycle time, and therefore, a low production rate. To address the problem of low speeds in the non pressing stage of a press production cycle presses with variable speed drive motors, known as servo presses, or hybrid servo presses, have been developed. For example, US2004/003729, entitled Drive unit and drive method for press, assigned to Komatsu, describes a press drive unit with a first drive system for driving a flywheel with a main motor and a second drive system for driving the drive shaft at variable speed with a sub motor.

To provide a servo press, one option is designing completely new press mechanics, and integrating a servo motor and associated transmission into this new design. This option, a new press design, is the option which can give a design which is best suited for servo operation, as the design can be optimized. For example it can be designed for optimal controllability of the press during the pressing phase, or for highest possible productivity. However, this option has high risks for both press manufacturers and their customers: the design will be new and thus unproven, and most often manufacturers and customers have, as yet, few or no clear specifications for how such a design should perform. As a result, different manufacturers will likely offer very different servo press designs, some slower than existing mechanical presses, some with extremely high power requirements, and in general with very different performances which may be unpredictable over a long service life. Servo presses, such as presses disclosed in patent application U.S. 60/765,183, sometimes described as having a Direct Drive Chain configuration, do not have a large flywheel and a clutch. A servo motor drives the press directly. At the start of the operation, the motor accelerates the press to a high speed, higher than the pressing speed. Thus the servo motor in a production system including a servo press has the function of driving a cyclic load which changes relatively rapidly with typical cycle times with a duration of some seconds. Then, before impact, the motor slows down the press to pressing speed. Pressing thus occurs at around the same speed as with the mechanical solution. As soon as pressing is completed, the motor once again accelerates the press to high speed. When the press has opened sufficiently for an unloader robot to enter the press, the motor starts slowing down the press. The servo press can thus reach a much improved cycle time at low pressing speeds, because of its capability to run at a high speed during the rest of the cycle.

However, the servo press requires a large motor and power converter (approx. five times larger than the fully mechanical press). Thus for an existing installation, installing a servo motor, such as in a servo press, to a production system may require installing a larger power supply to meet the combined electrical power at the same time as one or more other electric motors are running. In a new installation a larger power supply can be so dimensioned from the start, however, in both cases an increased cost is to be expected.

SUMMARY OF THE INVENTION

According to an aspect of the present invention a production system is described comprising at least one mechanical press driven at least in part by a flywheel powered by a first motor said system further comprising a second motor which is a servo motor, wherein the power of said first motor powering the flywheel is arranged controlled by a control unit dependent on a function of the power of at least one said second motor, the servo motor.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and the production system is a press line and said second motor, the servo motor, is arranged driving a press.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and said second motor, the servo motor, is arranged driving a device in conjunction with operation of a press and not driving the press.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and the function of the power of said second motor, the servo motor, is a function which is adjusted for a power loss in a power supply, or inverter, and associated power lines to said first motor and/or said second motor; which power loss may be due to any of the group of: inverter, rectifier, motor, cabling.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and said production system is a hybrid/mechanical press line and said second motor, the servo motor, is arranged to drive a hybrid mechanical press in which said first motor is arranged to provide power to said flywheel, said second motor is arranged driving the hybrid press, and where there are other first motors in the presses of said production system.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and said production system is a hybrid/mechanical press line and the power of at least one said second motor, the servo motor, is either measured or estimated or calculated using any or several quantities from the group of: current, voltage, torque, speed; said quantities being either measured quantities, estimated quantities, or setpoints.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and said production system comprises at least one control unit, including a memory storage device, for limiting the total peak power, both positive and negative, of the first motor (20) and the servo motor (22) to a value which is equal to or lower than the peak power of the servo motor alone.

According to another embodiment of the present invention a production system is described comprising a mechanical press driven at least in part by a flywheel powered by a first motor said system further comprising a second motor which is a servo motor, where the power of said first motor powering the flywheel is controlled on a function of the power of at least one said second motor, a servo motor, and arranged for power supply in which more than one inverter is connected to a single rectifier or a single diode rectifier.

According to another aspect of the present invention a method is described for operating a production system comprising at least one mechanical press driven at least in part by a flywheel powered by a first motor, said system further comprising a second motor, which is a servo motor, wherein the method comprises controlling the power of said first motor powering the flywheel dependent on a function of at least one said second motor, the servo motor.

According to an embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor using the function of the power of said second motor, the servo motor, which is a function adjusted for a power loss in a power supply, or inverter, and associated power lines to said first motor and/or said second motor.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor using the function of the power consumed by said second motor, the servo motor, which is a function adjusted for power losses, being a power loss due to any of the group of: inverter, rectifier, motor, cabling.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor powering the flywheel adjusted for a power loss in a power supply or inverter and associated power lines to said first motor and/or said second motor.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor powering the flywheel adjusted for a power loss in a power supply or inverter and associated power lines to said first motor and/or said second motor.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor providing power to said flywheel dependent on a power set-point for said second motor, the servo motor; or dependent on a set-point torque said servo motor.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and by controlling said first motor powering the flywheel such that the negative peak power can be limited to zero.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor powering the flywheel and limiting the peak negative power to zero such that the production system is controlled and operated to use regenerative braking of the servo motor and not supply back power to the grid.

According to another embodiment of the present invention a method is described for operating a production system comprising at least one mechanical press driven at least in part by a flywheel powered by a first motor, said system further comprising a second motor, which is a servo motor, the method comprising controlling the power of said first motor powering the flywheel dependent on a function of at least one said second motor, the servo motor, and controlling said first motor, the motor of the flywheel, to limit the total peak power, both positive and negative, of said first motor and said second motor to a value which is equal to or lower than the peak power of said second motor, the servo motor.

In a first aspect of the invention total peak power consumption of two or more electric motors driving devices in a production system is limited by means of a method for controlling said production system so that the power consumed or regenerated by a first motor powering the flywheel, or other device with relatively high inertia, is arranged controlled dependent on a function of the power consumed by a second motor driving a press or other device in the same production system, which second motor is a servo motor.

The second servo motor may be any servo motor in the same production system. It may be a drive motor for a servo press or a hybrid servo press. The servo motor as a press drive motor may drive the press the whole time, as in the case of a servo press. The servo motor may drive the press part of the time, as in the case of a hybrid servo press.

The second motor of the production system, the servo motor, may also or instead be a drive motor for an associated apparatus used in conjunction with a press, not driving the main press slide, equipment such as a press cushion (servo cushion), or transfer equipment for loading/unloading a press, or a robot or a doppin arranged for transferring material into/out of a press.

The invention may be applied to a production system in the form of a press line comprising one single press, such as a hybrid servo press. Alternatively a press line could comprise one mechanical press with a second servo motor arranged to drive equipment such as transfer equipment, press cushion, robot etc. The invention may also be applied to a servo/mechanical press line in which the second motor, servo motor, is in a first servo press, and the first motor, the high inertia or flywheel motor, is in a mechanical press. In this way the peak power of two presses combined may be limited by controlling the peak power to the first flywheel motor in the mechanical press dependent on the power consumed by the second, servo motor in a second and servo press.

The invention may be applied to a production system comprising:
- hybrid press: first and second motor are in same press
- servo/mechanical press line: second motor is in a servo press, first motor is in a mechanical press;
- servo/mechanical press line: second motor is in a servo press, there are multiple "first" motors in mechanical presses;
- hybrid/mechanical press line: second motor is in a hybrid press, there are multiple "first" motors in the hybrid press and the mechanical presses;
- hybrid press line: in each press there is a first motor and a second motor, the control is applied for each press separately.

The power limiting method may be used to limit peak power for a number of different configurations in which there is a second motor being a servo motor driving a cyclic load and any first motor driving a flywheel or other high inertia load that can be controlled dependent on the power consumed by the second motor so that the total peak power is limited. This means that for a press line with hybrid presses:

a) any flywheel motor in the whole press line can provide power for limitation in function of the power of any servo in the press line
b) any number of flywheel motors may be controlled together to provide power for limitation in function of the power of any servo motors in the press line, including a number of servo motors treated as a combination,
c) similarly any number of first motors, flywheel motors taken together may be controlled to provide power for limitation in function of the power of the combination of several or all other motors, not only servo motors, in the press line or production system.

In any type of press line or production system, any or several flywheel motors can be used to limit the total power of any number of motors combined in the line. There are many ways of grouping motors, either per press, per line, per part of the line, including motors in transfer equipment, press cushions, second slides etc, or not. In addition, any first motor driving a high inertia device may be utilised in a power limiting combination with one or more servo motors. Examples of other high inertia, substantially constant speed devices as well as flywheels are pumps and fans.

The production system is preferably arranged with a common power supply to at least said first motor providing power to said flywheel and to a said servo motor. The common power supply may be understood to mean any supply device, such as a cable, a bus bar, a transformer, a breaker/disconnector, a rectifier. Power supply to the first and second motors may be either AC or DC. The electric motors can be AC or DC motors, any type of electrical motor, rotating type. Servo may optionally be linear motor.

The control the power of a flywheel motor may be extended in detail to include the associated power converter of the flywheel motor as a function of the power consumed by another motor and its associated power converter (and even including cabling).

This is because the inventors have established that losses in power supplies, converters and even in cabling can be significant, depending on the installation.

One or more first motors, driving a high inertia load such as a flywheel, may be controlled dependent on the power consumed by a second motor, the servo motor. This power can be:
a) actual power consumed by the servo (eg measured at the input side of the converter (AC or DC), OR measured at the output side of the converter), or even mechanical output power of the servo motor;

b) estimated actual power consumed by the servo (eg estimated by the controller, for example multiplying a torque estimate with a speed (measured or estimated), possibly adding an estimate of losses in the motor and/or losses in the converter), c) an estimated "power" setpoint of the servo (by the controller, multiplying for example a torque setpoint with a speed (measured or estimated), possibly adding an estimate of losses as above).

Tests with prototypes have been carried out using an estimated power setpoint. Since the real power has some delay compared to the setpoint, this means that the power of the flywheel motor may be changed in time. However, if the actual power (i.e. not the setpoint but the real value) was used, control of the flywheel motor would have to be instantaneous in order to avoid spikes in the total power. Thus use of a setpoint for power or a function of a setpoint for power of the second motor, the servo motor, provides the further advantage of providing a control mode over one or multiple first motors, flywheel motors which limits total peak power for parts of the system and which, in practice, places fewer demands on control systems running the production system.

To realize some of the above objects, a servo motor and associated transmission (gears) are preferably built together as a unit, to modify an existing mechanical press with a flywheel drive into a hybrid servo press, as described in an international patent application IB20071001525 entitled "Motor upgrade kit for a mechanical press" assigned to ABB which is hereby included in this specification in its entirety by means of this reference. The described unit is designed to be mounted on top of the press crown, and to connect to the existing press gears without requiring any modification of the existing press mechanism. In the description, the term servo motor is used to mean any type of controllable, variable-output electric motor.

The Press Motor Upgrade Kit described therein is a unit which is mounted on the press in one part. It is fixed to the top or other structural part of the press crown, with sufficient mounting accuracy and rigidity. On the baseplate or structure of the unit is mounted the (servo) motor or motors. Through a coupling this motor is connected to gear wheels of the mechanical press, which gears will typically reduce the speed of the motor to a lower speed of an existing gear in the press crown. This connection will then allow the upgrade motor to move the press gears at variable speed, both in positive and negative direction and up to a higher speed (eg. 50% higher) when not stamping than the maximum stamping speed the mechanical press drive was originally designed for. Another advantage is the increased flexibility of production cycle made possible. For example, the hybrid servo technology described here allows pressing at lower speed while maintaining cycle time, or alternatively pressing at an identical speed but with shorter cycle time, or a mix of these two.

The ability to reduce peak power by a factor two is very advantageous, both for new installations and retrofits. For a new installation, cost of components such as the rectifier, the cabling and protection equipment will be significantly lower. For a retrofit, the power limitation allows an improvement in the performance of an existing installation or production system without the technical challenges financial cost of having to upgrade the factory electrical power supply. In both the new and the retrofit cases, a reduced cost for electrical power is provided by peak power limitation when the power utility is billing for peak power, in which case the normal expected cost for electrical power is reduced compared to what would normally be expected with motors running at the peak of their rated power.

A computer program for carrying out a method of the invention, and the computer program recorded on a computer-readable medium and the computer program stored in a memory storage device, for example in a control unit, controller or drive controller, is disclosed in another aspect of the invention.

BRIEF DESCRIPTION OF THE DRAWINGS

Embodiments of the invention will now be described, by way of example only, with particular reference to the accompanying drawings in which.

DETAILED DESCRIPTION OF THE INVENTION

Figure 1:
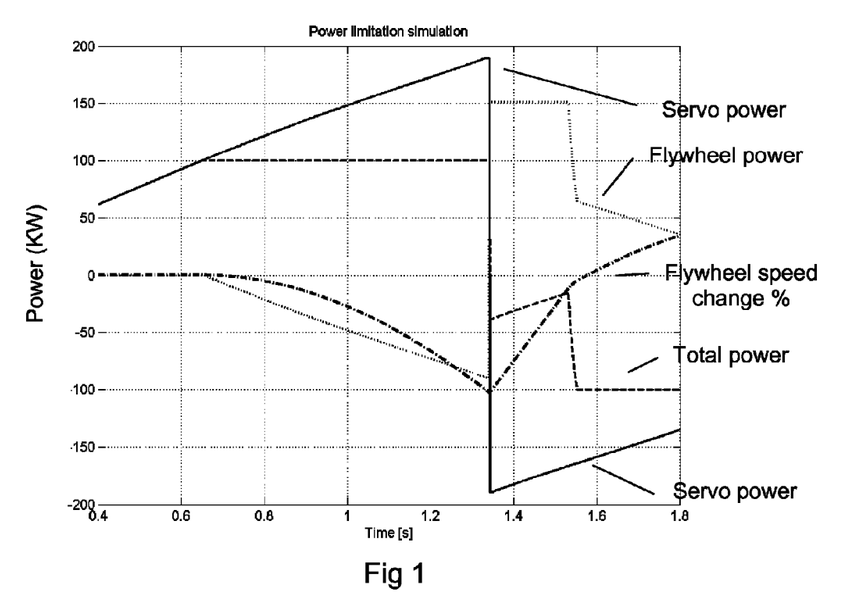
FIG. 1 is a diagram of a simulation of the power limitation, in which is shown: Servo power, flywheel power, total power, flywheel speed changes in % ×100 according to an embodiment of the invention.

FIG. 1 is a diagram showing measured values against time (in seconds) for a simulation of peak power limiting by controlling a flywheel motor dependent on power of a servo motor. The curves show values for servo motor power, flywheel motor power, flywheel speed changes in %, and total power which is the combined total power consumption of both motors.

In this simulation torque control has been assumed ideal and instantaneous. An example simulation is shown in FIG. 1. Here, the total power limit had been set to 100 kW. As soon as servo power increases above this value, flywheel motor power becomes negative, keeping the total at 100 kW. When the sign of the servo power changes, the flywheel speed controller first brings flywheel speed back to close to its desired value. Then, the power limitation continues to ensure that negative total power is limited to −100 kW. In this simulation, flywheel speed drops by only 1%.

Figure 2:
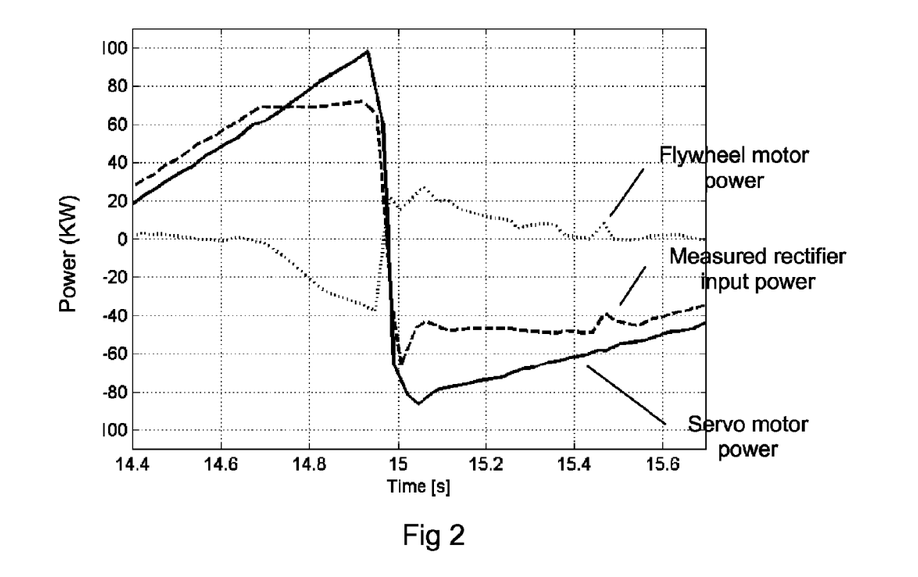
FIG. 2 is a diagram of a measurement of power limitation, in which is shown: Servo motor power flywheel motor power, calculated total power, measured rectifier input power.

FIG. 2 is a diagram showing measured values against time for a test installation. The curves show values for servo motor power, flywheel motor power, measured rectifier input power, and calculated total power. FIG. 2 shows experimental results of the power limitation implemented in a test installation. In this test, the power limit was set to 60 kW, while peak power of the servo drive reaches 100 kW. This curve shows that the limitation is working well, and is similar to the simulation. However, rectifier input power is more than the desired 60 kW, since the power limitation algorithms implemented in the test did not take into account motor, inverter and rectifier losses. Rectifier power is thus always more positive than the desired limits. This may be compensated for by adding a loss estimation to the power limitation algorithms.

Figure 3:
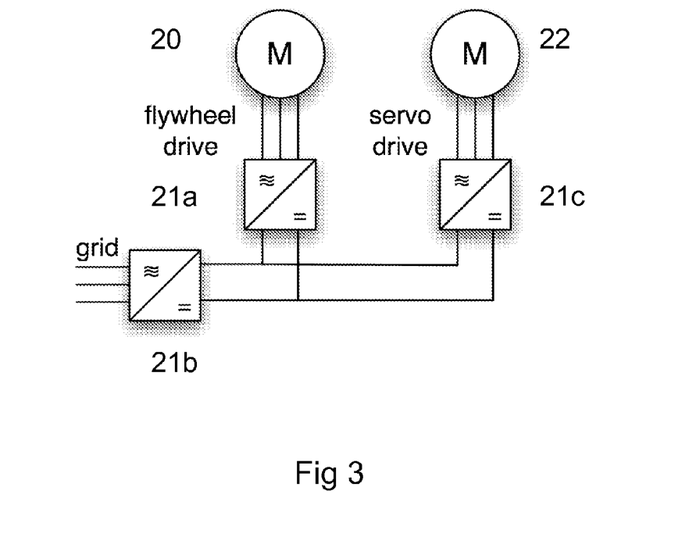
FIG. 3 is a schematic block diagram for a power supply system layout according to an embodiment of the invention.
Figure 4:
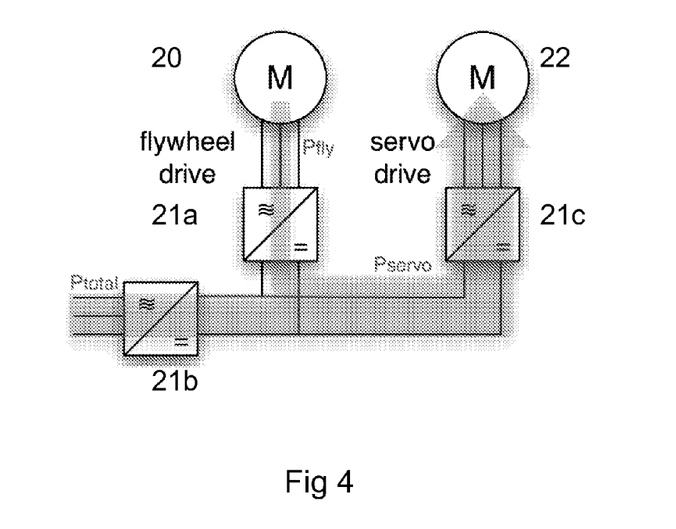
FIG. 4 is a schematic block diagram for the power supply system layout of FIG. 3 showing an example of power flow during limitation according to an embodiment of the invention.

FIG. 3 is a graphic diagram for a power supply system layout in a production system according to an embodiment. The diagram shows a flywheel drive motor 20 and a servo motor 22, each arranged with an inverter 21a, 21c. Both inverters are connected to one converter/inverter 21b, which is connected to a grid.

System dimensioning. The production system investigated in a test installation uses the basic configuration shown in FIG. 3. The flywheel drive is equipped with a 160 kW induction motor 20, the servo drive a 189 kW permanent magnet synchronous motor 22. The two drives in this case are operated without overloading, i.e. the peak power consumed—or regenerated—by each of the drives is equal to their nominal power. The two inverters 21a, 21c are dimensioned for this power. Without any power limitation, the rectifier and the power connections would have to be dimensioned for a power of 160+189=349 kW (or somewhat more, if losses in all three converters are taken into account).

The ability to reduce peak power by a factor two is very advantageous, both for new installations and retrofits. For a new installation, cost of the rectifier, the cabling and protection equipment will be significantly lower. For a retrofit, the power limitation allows an improvement in the performance of an existing installation or production system without having to upgrade the factory electrical installation. In both cases, limitation is further advantageous if the power utility is billing for peak power, in which case the normal expected cost for electrical power is reduced compared to what would normal be expected with motors running at the peak of their rated power. In an example case, total peak power has been reduced from 160 (Flywheel motor)+189 (servo motor)=349 kW to just 160 kW.

The goal of the power limitation described in this description is to limit the total peak power as much as possible, by controlling the power consumed or regenerated by the flywheel drive as a function of the power consumed by the servo drive. An example operation point is graphically illustrated in FIG. 2, described above. An absolute lowest limit of the total peak power equals the power of the flywheel drive, since limiting power more would affect the performance of this drive, for example at flywheel startup or when recovering kinetic energy taken from the flywheel by an operation of the mechanical press.

A practical challenge is controlling (limiting) the flywheel drive power fast enough so that it can follow the dynamics of the servo drive. Fast torque control of the flywheel drive is a prerequisite, but is not sufficient. Since the power of the servo drive is known in the servo controller and the flywheel drive is (typically) controlled by a different controller, communication delays will typically occur. Also, the dynamic response of the flywheel drive will have some inevitable delay, which would cause spikes in the total power whenever a rapid transient in servo power occurs. The inventor has found that this effect can almost completely be eliminated by using not actual servo power as an input to the torque limit calculations, but a power setpoint such as represented by the servo torque setpoint and servo speed. If the response of the flywheel drive to its setpoint is similar to that of the servo drive, and communication delay is sufficiently low, total power spikes can be avoided. Thus, as previously described in reference to FIGS. 1, 3 a value of a power setpoint for the servo motor 22 may be used instead of a measured or actual servo power to avoid difficulties due to a communication delay.

Figure 5:
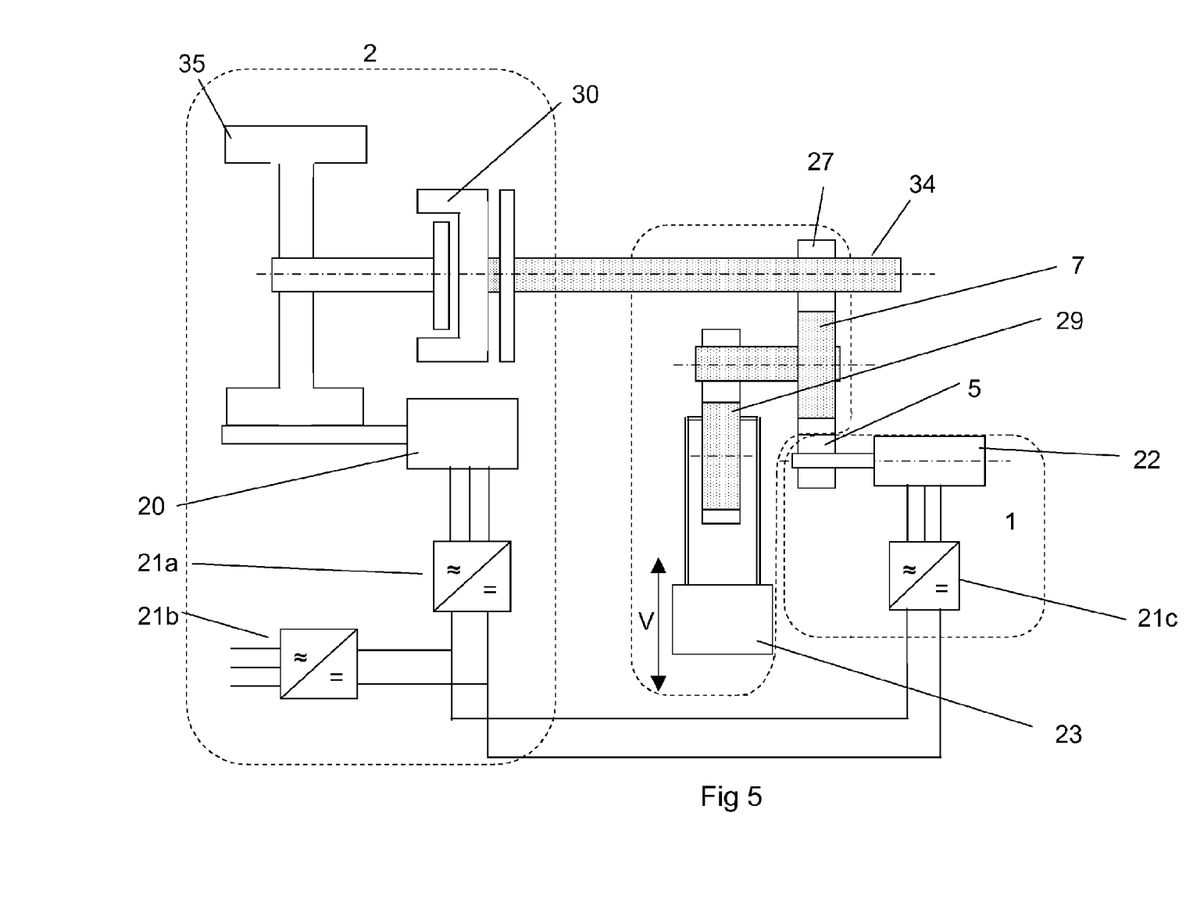
FIG. 5 is a schematic block diagram for a motor upgrade kit for a mechanical press, according to an embodiment of the invention.

FIG. 5 shows the topology of a mechanical press with two drives: a mechanical drive 2 comprising a clutch 30 and flywheel 35, with associated motor 20, and a servo motor 22 with associated transmission 5. The figure also shows a press ram 23 which is driven in a reciprocal motion V by a main shaft 34 via press transmission gears 27 and an eccentric wheel 29 and to open and close the press.

With both drives, existing motor 20 and upgrade motor 22 in operation this is the topology of a hybrid servo press. With only the mechanical drive in place or operating, this would be a classic mechanical press. With only the motor upgrade Kit 1 operating, (and, possibly, an emergency brake), this would be a "full" servo press.

Figures 6A, 6B:
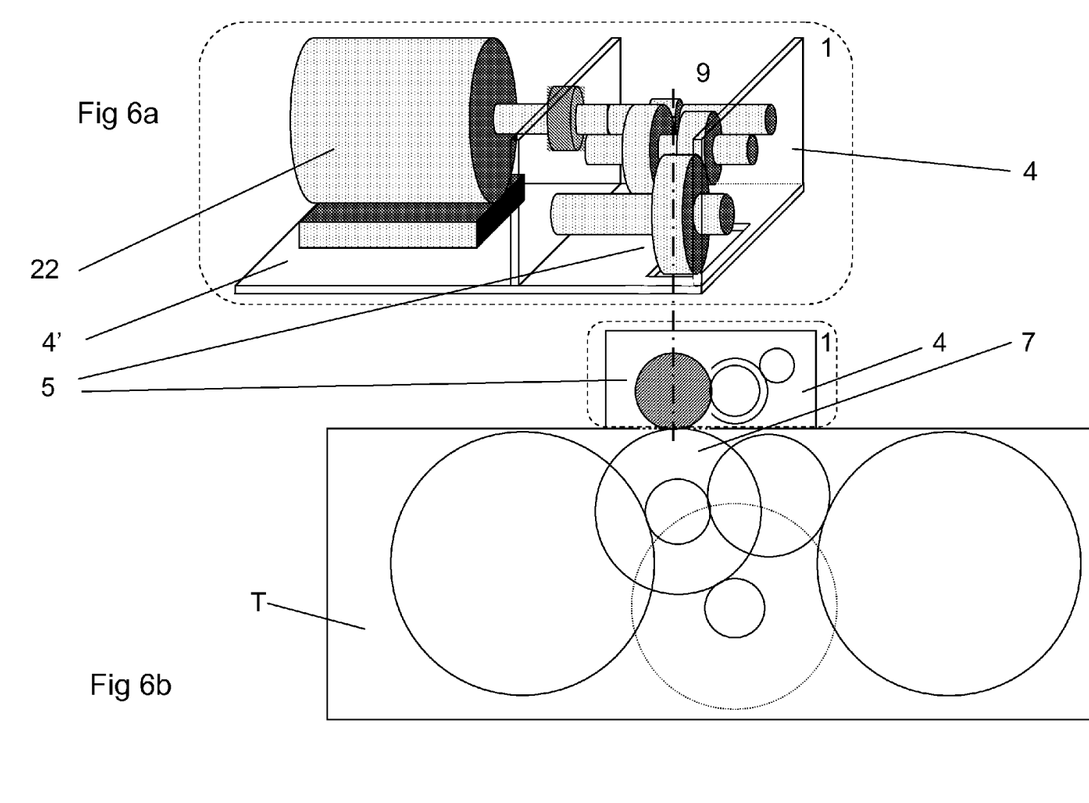
FIG. 6a is a schematic diagram showing a perspective view of a motor upgrade kit for a mechanical press, according to an embodiment of the invention.
FIG. 6b is a schematic diagram comprising a view of the crown part of a mechanical press as a front elevation together with the relative position of a motor upgrade kit, according to an embodiment of the invention.

FIG. 6a shows a principle drawing of an upgrade kit 1 with a single motor, as well as a schematic diagram of how the kit would interact with the gears of a press in FIG. 6b. FIG. 6a shows the motor upgrade motor 22 mounted on a structural baseplate 4, to which is also attached a set of gears 9 for transmitting power from the motor 22. FIG. 6b shows a diagram of the crown or top T of a mechanical press. The figure shows the kit 1, with the upgrade motor 22 and a set of gears 9 arranged on a baseplate 4. The kit is shown here arranged on top of the crown of the press such that a gear 5 (FIG. 5) of the set of gears 9 of the kit 1 is arranged to cooperate with a gear 7 (FIG. 5) of the existing power transmission train of the mechanical press so that the upgrade motor 22 can drive the press through the existing power train of the press.

A press that has been upgraded may be arranged with one or more control units to control the new motor. A control unit may also be arranged to control both motors. The benefit of adding a servo motor to an existing mechanical press is that the speed of the servo motor is varied in an adaptive manner during a press cycle and that the servo motor may also be controlled synchronize a movement of the hybrid servo press to a movement or position of at least one other device in the press line or in a production system including a press line. A control unit or control system may also be arranged to control the existing or new motor of the flywheel and its existing or new inverter to limit the total peak power (both positive and negative) of the two motors (20, 22) to a value which is equal to or lower than the peak power of the servo motor, using the flywheel as an energy buffer, as described above in respect of FIGS. 1-4.

The motor speed control means may comprise a frequency converter, an inverter/rectifier as shown or other motor speed control means. Motor speed control means may also be shared with other presses or machines in a press line or a production system. The drive may be a multidrive, i.e. a system where two or more inverters share a single rectifier. This is advantageous for the case where due to the above mentioned power limitation the peak power of the rectifier is lower than or equal to the peak power of the inverter for the servo motor. It should also be noted that in arrangements of an upgrade press with which the flywheel is NOT used for pressing (i.e. when run not a hybrid servo but a direct/full servo), the flywheel may still be used for the above mentioned power limitation.

The rectifier may be arranged to be bi-directional, so that energy can be fed back to the grid. Since in that case the rectifier is an active rectifier, it can supply reactive power to the factory grid. It may thus be used to compensate for some of the reactive power consumed by rectifiers used in other presses.

Possible Configurations Include:
existing flywheel motor, inverter, rectifier maintained
existing flywheel motor, inverter, rectifier replaced, rectifier shared with servo drive (this allows maximum peak power limitation)
existing motor maintained, but inverter and rectifier replaced (almost same as previous, if motor is AC motor)

The servo motor may be controlled to run according to different strategies for different types of press cycle. For example higher than pressing speed before and after pressing, in order to reduce cycle time AND/OR maintain cycle time but reduce pressing speed.

Figure 7:
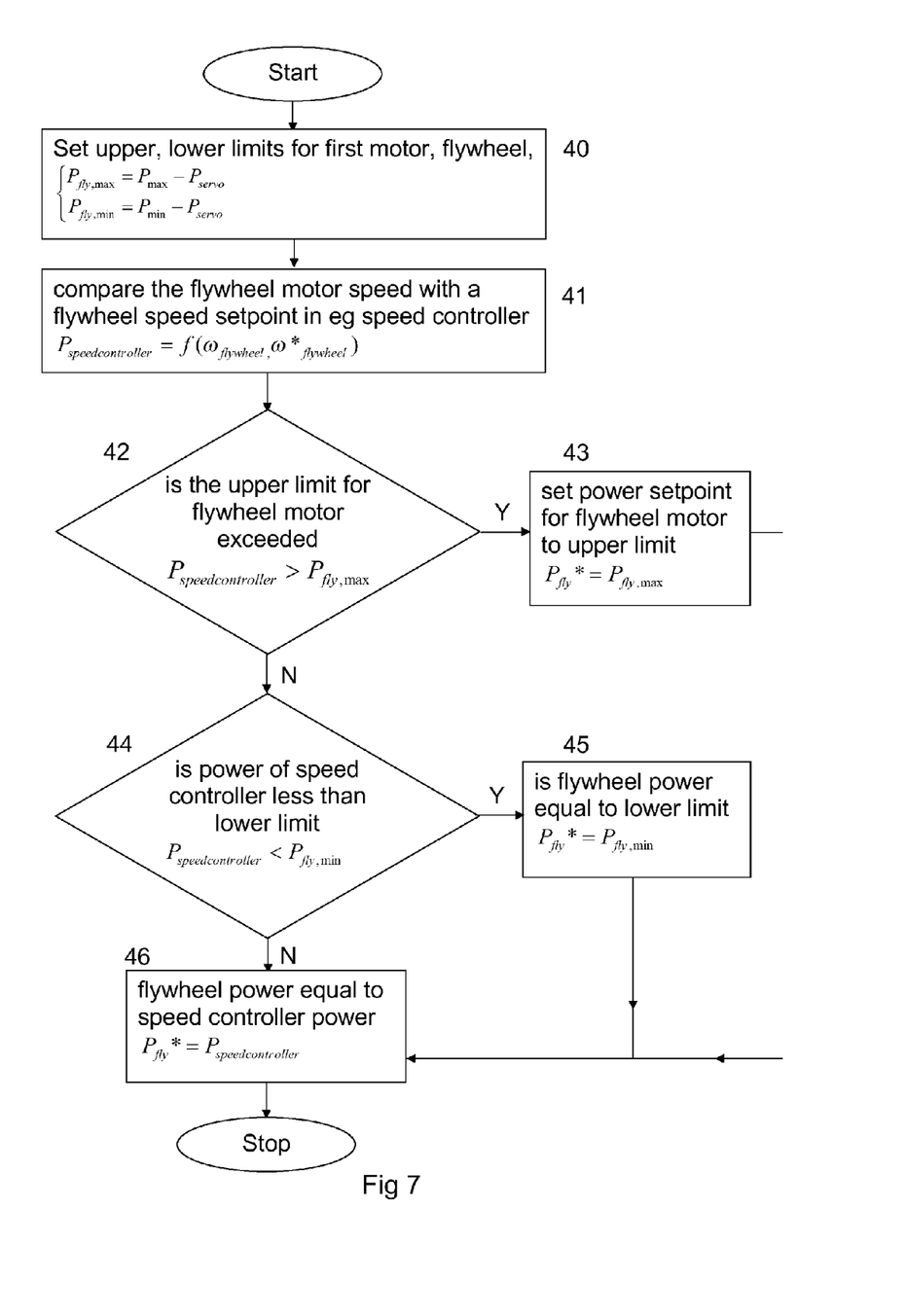
FIG. 7 is a flowchart for a method according to an embodiment of the invention.

FIG. 7 shows a flowchart for a method according to an embodiment of the invention. The flowchart shows a step 40 in which two limits are calculated for the speed controller of the first, flywheel motor, these being for example an upper limit as in the form of $$\begin{cases} P_{fly,max} = P_{max} - P_{servo} \\ P_{fly,min} = P_{min} - P_{servo} \end{cases}$$

In another step 41 the flywheel motor speed controller compares the flywheel speed with a flywheel speed setpoint $$P_{speedcontroller} = f(\omega_{flywheel}, \omega^*_{flywheel})$$

In step 42 a comparison is made between the output of the speed controller and the upper limit $$P_{speedcontroller} > P_{fly,max}$$

and if the power is greater step 43 then the power setpoint for the flywheel motor is set to the upper limit:

$$P_{fly}^* = P_{fly,max}$$

Otherwise at step 44 when the speed controller power is not greater than the upper limit for flywheel power then a comparison is made between the power of the speed controller and the lower limit, as in $$P_{speedcontroller} < P_{fly,min}$$

then at step 45 the flywheel setpoint is compared to the lower limit for the flywheel motor;

$$P_{fly}^* = P_{fly,min}$$

and if it is equal then power limitation has been applied:
and when following step 44 the power of the speed controller is not less than the flywheel lower limit, then the flywheel power set point made is equal to the speed controller power, at step 46

$$P_{fly}^* = P_{speedcontroller}$$

then the peak power limitation has been applied.

Note that the maximum flywheel power may be negative, and the minimum may be positive! Since most drives accept only a positive maximum limit and a negative minimum limit, this poses a first implementation challenge. Furthermore, for practical implementation the power limits had to be translated into torque limits.

In addition, line coordination of an entire process section may be improved by controlling such a line using a single controller arranged to carry out methods according to an embodiment of the invention, due in part to the improved controllability of the direct servo or hybrid servo presses. This may be carried out by a robot controller unit and/or by another control unit. Coordination or optimisation may be achieved in part by adapting speed during opening/closing a press (while for example maintaining a required speed and energy output during the pressing/stamping part of the cycle), resulting in cycle times which may be reduced dependent on parameters such as: a state of a downstream process; or a state of an upstream process or another consideration such as overall power consumption; reduced energy consumption; smoothing power consumption peaks in the press line.

In another embodiment the power limit of the first motor, the flywheel motor is dependent on a function of the power consumed by said second motor, which function is adjusted for an actual or estimated net output power of the second motor, the server motor. power losses in a power supply or inverter and associated power lines.

In another embodiment a production system may comprise a power limiting control wherein the negative peak power can be limited to zero. This will not be possible in all installations, depending on the dimensioning and operation modes of the two motors, BUT in cases where it is possible, it is especially advantageous since this means that a diode rectifier can be used instead of a bi-directional rectifier.

The advantage of limiting the peak negative power to zero is that using power limitation as proposed, the production system may be controlled and operated to use regenerative braking of the servo motor and yet NOT supply back power to the grid (by using the flywheel as a buffer). This simplifies adaptations to existing installations where supplying back power to the grid is not allowed, or not feasible without extensive changes.

The methods of power limitation as described above in this specification may be carried out by a computer application comprising computer program elements or software code which, when loaded in a processor or computer, causes the computer or processor to carry out the method steps. The functions of the method as described and in relation to FIG. 7 may be carried out by processing digital functions, algorithms and/or computer programs and/or by analogue components or analogue circuits or by a combination of both digital and analogue functions.

The methods of the invention may, as previously described, be carried out by means of one or more computer programs comprising computer program code or software portions running on a computer or a processor. The microprocessor (or processors) comprises a central processing unit CPU performing the steps of the method according to one or more facets of the invention. This is performed with the aid of one or more said computer programs, such as, which are stored in a computer readable memory or in a memory storage device. A part of the program may be stored in a processor and/or also in a ROM, RAM, PROM, FPGA, EPROM or EEPROM chip or similar memory means. The processor or other memory storage device may be in a control unit or in a motor controller or in a motor drive controller. The programs for carrying out the methods may as well run in a local or central control system in a local or distributed computerised control system.

The program in part or in whole may also be stored on, or in, other suitable computer readable medium such as a magnetic disk, CD-ROM or DVD disk, hard disk, magneto-optical memory storage means, in volatile memory, in flash memory, as firmware, stored on a data server or on one or more arrays of data servers. Other known and suitable media, including removable memory media such as Sony Memory Stick® and other removable flash memories, hard drives etc. may also be used.

The computer programs described may also be arranged in part as a distributed application capable of running on several different computers or computer systems at more or less the same time. Programs as well as data such as start positions, or flag-related information may be made available for retrieval, delivery or, in the case of programs, execution over the Internet. Data may be accessed by means of any of: OPC, OPC servers, an Object Request Broker.

It should be noted that while the above describes exemplifying embodiments of the invention, there are several variations and modifications which may be made to the disclosed solution without departing from the scope of the present invention as defined in the appended claims.

What is claimed is:

1. A production system comprising:
    at least one mechanical press driven at least in part by a flywheel powered by a first motor;
    at least one second motor which is a servo motor, the power of said first motor dependent on a function of a power of the at least one said second motor; and
    a control unit comprising software for controlling the power of said first motor, the control unit configured to limit the total peak power of the first motor and the second motor to a value which is lower than the peak power of the second motor, the control unit configured to limit peak negative power of the first motor and the second motor to zero such that the production system is controlled and operated to use regenerative braking of the servo motor and not supply back power to a grid.

2. The system of claim 1, wherein said production system is a press line and said second motor is arranged driving a press.

3. The system of claim 1, wherein said production system is a press line and said second motor is arranged driving a device in conjunction with operation of a press and not driving the press.

4. The system of claim 1, wherein the function of the power of said second motor is a function which is adjusted for a power loss in a power supply, or inverter, and associated power lines to said first motor and/or said second motor.

5. The system of claim 1, wherein the function of the power consumed by said second motor is a function which is adjusted for power losses, due to any of the group consisting of: inverter, rectifier, motor, and cabling.

6. The system of claim 1, wherein the power of said first motor powering the flywheel is arranged, controlled and adjusted for a power loss in a power supply or inverter and associated power lines to said first motor and/or said second motor.

7. The system of claim 1, wherein the function of the power consumed by said second motor, the servo motor, is a function which is not adjusted for power losses in some of the group consisting of: inverter, rectifier, motor, and cabling.

8. The system of claim 1, wherein said production system is a press line and said second motor is arranged to drive a hybrid mechanical press in which said first motor is arranged to provide power to said flywheel.

9. The system of claim 1, wherein said production system is a hybrid/mechanical press line and said second motor is arranged to drive a hybrid mechanical press in which said first motor is arranged to provide power to said flywheel, said second motor is arranged driving the hybrid press, and where there are other first motors in a plurality of presses of said system.

10. The system of claim 1, wherein said production system is a servo/mechanical press line comprising at least two presses and where said second motor is arranged driving a servo press and said first motor is arranged in a mechanical press or hybrid mechanical press providing power to said flywheel of the press.

11. The system of claim 1, wherein said production system is a servo/mechanical press line comprising more than two presses and said second motor is arranged driving a servo press and a plurality of said first motors are each arranged in a mechanical or a hybrid mechanical press providing power to a said flywheel of the plurality of mechanical or hybrid presses.

12. The system of claim 1 wherein said production system is arranged with a common power supply to at least said first motor providing power to said flywheel and to said servo motor wherein the power is supplied by any from the group consisting of: cable, bus bar, transformer, breaker/disconnector, and rectifier.

13. The system of claim 1, wherein said flywheel motor is arranged controlled dependent on a power set-point for said servo motor.

14. The system of claim 1, wherein the power of at least one said second motor is either measured or estimated or calculated using any or several quantities from the group consisting of: current, voltage, torque, and speed; said quantities being either measured quantities, estimated quantities, or setpoints.

15. The system of claim 1, wherein the control unit limits the total peak power, both positive and negative, of the first motor and the servo motor.

16. The system of claim 1, wherein the control unit limits the total peak power, both positive and negative, of the first motor and the servo motor to a value which is equal to or lower than the peak power of the servo motor alone.

17. The system of claim 1, wherein more than one inverter is connected to a single rectifier or a single diode rectifier.

18. A method for operating a production system having at least one mechanical press driven at least in part by a flywheel powered by a first motor, said system further including a second motor, which is a servo motor, and a control unit having software for controlling the power of said first motor, the method comprising the steps of:
    controlling the power of said first motor powering the flywheel dependent on a function of said second motor,
    controlling said first motor powering the flywheel and limiting peak negative power of the first motor and the second motor to zero such that the production system is controlled and operated to use regenerative braking of the servo motor and not supply back power to a grid,
    wherein total peak power of the first motor and the second motor is limited to a value which is lower than the peak power of the second motor.

19. The method of claim 18, further comprising powering a mechanical press in press line in said production system by means of said second motor, the servo motor.

20. The method of claim 18, further comprising powering a mechanical press arranged as a hybrid mechanical press in said production system by means of said second motor, the servo motor, and with said first motor providing power to said flywheel.

21. The method of claim 18, wherein said production system is a press line which includes at least one second mechanical press.

22. The method of claim 18, further comprising controlling said first motor using the function of the power of said second motor, the servo motor, which is a function adjusted for a power loss in a power supply, or inverter, and associated power lines to said first motor and/or said second motor.

23. The method of claim 18, further comprising controlling said first motor using the function of the power consumed by said second motor, the servo motor, which is a function adjusted for power losses, being a power loss due to any of the group consisting of: inverter, rectifier, motor, and cabling.

24. The method of claim 18, further comprising controlling said first motor powering the flywheel adjusted for a power loss in a power supply or inverter and associated power lines to said first motor and/or said second motor.

25. The system of claim 1, further comprising controlling said first motor using wherein the function of the power consumed by said second motor, the servo motor, is a function which is not adjusted for power losses in some of the group consisting of: inverter, rectifier, motor, and cabling.

26. The method of claim 18, further comprising controlling said first motor providing power to said flywheel dependent on a power set-point for said second motor, the servo motor.

27. The method of claim 18, further comprising controlling said first motor powering the flywheel dependent on a set-point torque said servo motor.

28. The method of claim 18, further comprising arranging said production system for power supply by one inverter, or at least two inverters connected to a single rectifier, and a control unit or control system arranged for control of said first motor, the motor of the flywheel, to limit the total peak power, both positive and negative, of said first motor and said second motor to a value which is lower than the peak power of said second motor, the servo motor.

\* \* \* \* \*